Figure 3:
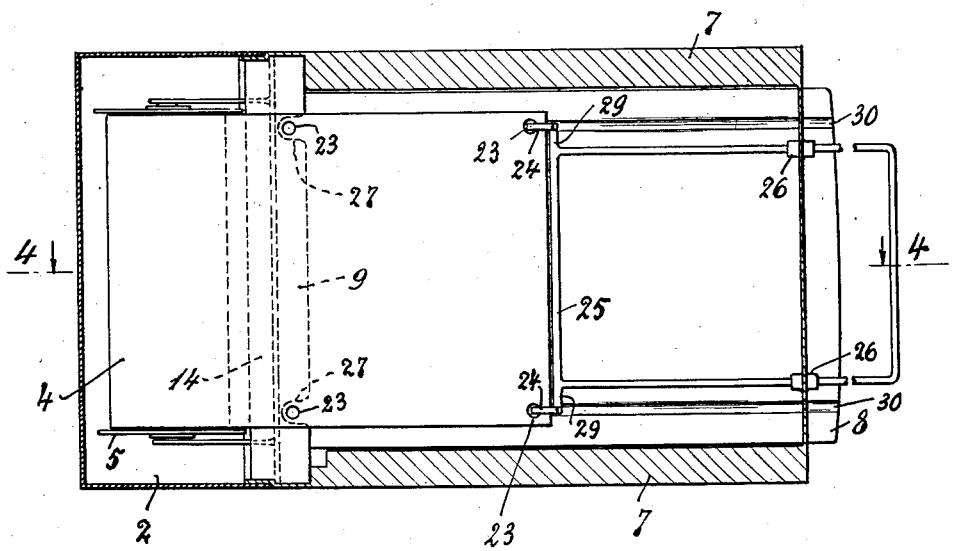

Feb. 21, 1933.   W. WIDMANN   1,898,232
BACKPIECE FOR FILM CAMERAS
Filed Jan. 3, 1930   2 Sheets-Sheet 1
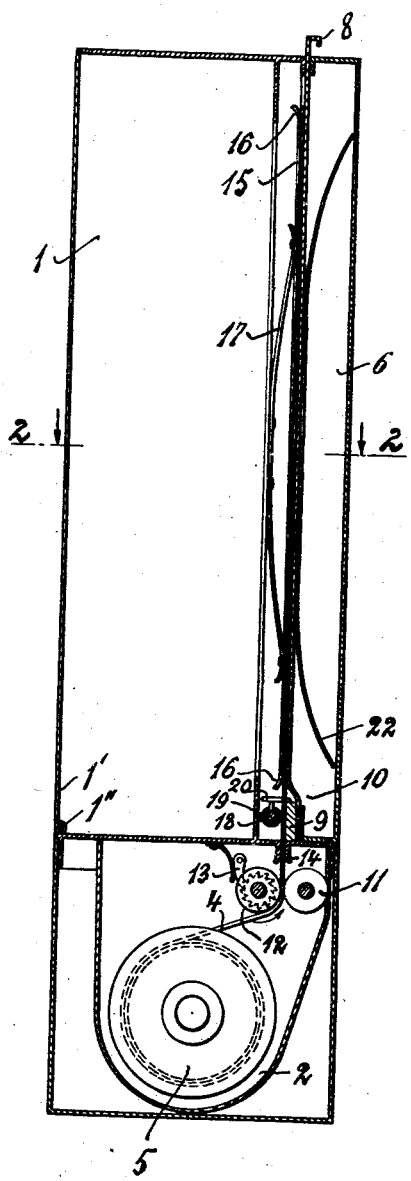
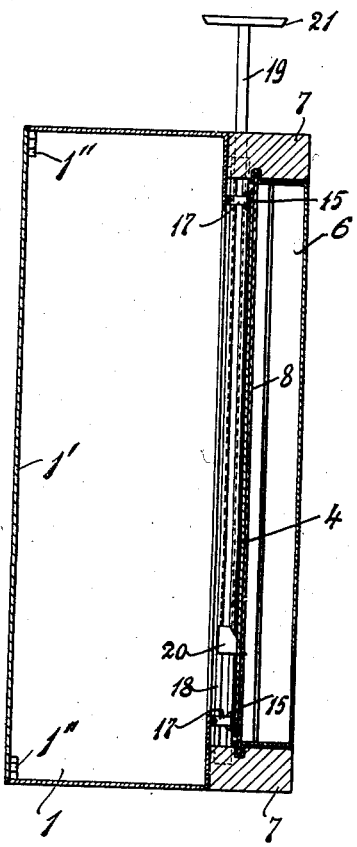
Inventor:
Wilhelm Widmann
by Kinkaid
Atty.

Feb. 21, 1933.  W. WIDMANN  1,898,232
BACKPIECE FOR FILM CAMERAS
Filed Jan. 3, 1930   2 Sheets-Sheet 2

Inventor:
Wilhelm Widmann
by Kirschbaum
Atty.

Patented Feb. 21, 1933

1,898,232

UNITED STATES PATENT OFFICE

WILHELM WIDMANN, OF FREUDENSTADT, GERMANY

BACKPIECE FOR FILM CAMERAS

Application filed January 3, 1930, Serial No. 418,216, and in Germany January 2, 1929.

My invention relates to back pieces for film cameras. It is an object of my invention to provide a back piece which permits the picture to be inspected on a ground-glass screen before it is exposed, and to remove any desired film independently of the supply.

To this end I provide a supply of film, usually a spool, at one side of the back piece in a suitable film holding compartment from which supply a film is fed across the area of exposure. Below the path along which the film moves while being fed I provide a dark slide the lid of which when closed supports the film. At a point intermediate the film holding compartment and the area of exposure I provide a cutter for detaching the exposed film from the supply.

When the lid of the dark slide is withdrawn the film which has been separated drops into the dark slide whereupon the lid is closed and any number of fresh films may be fed, exposed, separated and stored in the dark slide from which they may be removed for exposure.

It is another object of my invention to facilitate the penetration of the film into the dark slide. To this end I wind the film on the bobbin with the sensitive layer on the outside. The film normally arches so that the layer is on the convex side so that when released by the lid of the dark slide it is jerked into the dark slide by its own resiliency.

The expedient of winding the film on the spool in the manner aforesaid is not the only solution of the problem of imparting to the film an arching tendency as this tendency may also be imparted to the film during its manufacture.

It is another object of my invention to provide means for exposing only part of the film, for instance half the picture size of the camera. To this end I perforate the film at the edges in accordance with the part sizes to be exposed and provide means accessible from the outside for moving the film across the dark slide into the desired position. This is effected by hooks engaging in the perforations which are so connected with the means as to rise from the holes when the means are returned to the initial position, and engage the next set of holes for feeding the following part size of film.

It is another object of my invention to so design the means for feeding the film through the medium of hooks as described that when extracted from the back piece the means serve for inspecting the picture to be exposed.

As compared with the usual film cameras having a back piece with a supply and a winding spool, my novel back piece has the advantages of permitting inspection of the picture on a screen and of eliminating the necessity of exposing the complete supply for developing a given picture.

In the drawings affixed to this specification and forming part thereof two types of back pieces are illustrated diagrammatically by way of example.

In the drawings

Figure 4:
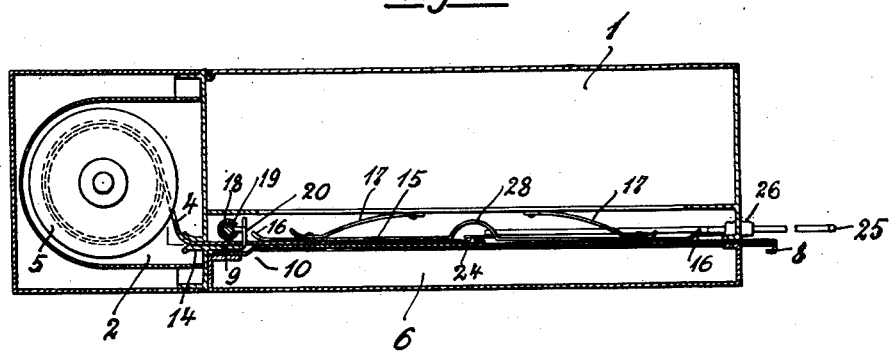

Fig. 1 is a vertical longitudinal section of a back piece having rotary parts for feeding the film, Fig. 2 is a section on the line 2—2 in Fig. 1, Fig. 3 is a sectional plan view of a back piece having hooks for feeding the film and exposing part sizes as described, and Fig. 4 is a section on the line 4—4 in Fig. 1.

Referring now to the drawings and first to Figs. 1 and 2, 1 is a back piece, 1' is the bottom plate of the camera which is hinged to the back piece at 1'', the objective and the bellows of the camera (not shown) being housed and folded in the cavity of the back piece in the usual manner when the bottom plate 1' is in the closed position as illustrated, 2 is a film holding compartment at one side of the back piece, with a supply of film 4 on a suitable spool 5, 6 is a dark slide which is inserted at the rear of the back piece 1 in place of the usual screen, not shown, 7, 7 are two bars extending along the edges of the back piece for holding the dark slide 6, the folded-over sides of the dark slide engaging in corresponding grooves of the bars, as best seen in Fig. 2, and 8 is the lid of the dark slide. 9 is a transverse bar at the wall of the back piece which adjoins the film compartment 2, and 10 is a kink in the dark slide and its lid which permits the inner end of the dark slide to be inserted below the bar 9.

11 and 12 are feed rollers which engage the film between them. One of the rollers, for instance 11, is provided with a suitable handle, not shown, for rotating it, and the other roller 12 has a ratchet and pawl mechanism 13 for preventing rotation against the arrow in Fig. 1.

14 is a guide or lip in the wall of the film holding compartment 2 through which the film 4 enters the back piece 1. The entering film slides on the top of the bar 9 which is at the same level as the lid 8 beyond the kink 10, and now moves on on the lid. 15, 15 are presser bars with upturned ends 16 which hold the film engaged with the lid under the pressure of springs 17, 17 as best seen in Fig. 2.

18 is a slotted tubular guide extending in parallel relation with respect to the bar 9, 19 is a rod fitted to slide in the tube 18, and 20 is a knife which is secured to the rod 19 by means projecting through the slot in the tube 18. 21 is a handle on the end of the rod 19 which projects from the side of the back piece, as shown in Fig. 2.

The knife 20 and the edge of the bar 9 make up the cutter, the knife 20 extending to below the upper face of the bar. The edge of the knife 20 is preferably inclined as illustrated in Fig. 2 which shows the knife in an intermediate position. It will appear that the knife enters the cavity below the film 4 which is formed by the kink 10 so that the film at this point is unsupported and readily severed.

In operation, after the picture has been exposed, the handle 21 is pulled out to move the knife 20 along the bar 9 and to sever the exposed end of the film. The film is held on the lid of the dark slide 6 by the presser bars 15 and springs 17 and when the lid 8 is extracted, the film penetrates into the dark slide with its ends advancing, and assumes in the dark slide the arched position illustrated at 22 in Fig. 1. The lid 8 is now reinserted, forcing down the film 22, and forcing up the presser bars at their upturned ends 16. The back piece is now ready for the reception of the next film which is fed forward as described.

Referring now to Figs. 3 and 4, the back piece with the film holding compartment, the dark slide and the cutter have been indicated by the same reference numerals as in Figs. 1 and 2.

In the present instance, the film 4 is perforated at its edges, the perforations 23 being pitched apart for a distance corresponding to the size to be exposed, in the present instance, to half the length of the full size. The holes are engaged by hooks 24 at lugs 29 projecting from the sides of an open rectangular frame 25 which is guided in sleeves 26 in the side of the back piece. Obviously the sleeves must exclude the light.

The presser bars 15, with their upturned edges and their springs 17, are designed as described with reference to Figs. 1 and 2 but each presser bar at its centre is provided with an arch 28. When the frame 25 has been moved to its inner final position to engage the holes 23 at the end of a film—the bar 9 being recessed at 27 for the reception of the hook 24—and the frame is now pulled out, the lugs 29 strike the arches 28 when the film has arrived in the desired position and the resistance indicates to the operator that he must not pull out the frame 25 any more. When the film has been exposed it is severed by the cutter as described, and dropped into the dark slide 6.

The hooks 24 may be resilient or combined with some resilient means so that they will engage the perforations 23 under the action of such means. If desired, the lid 8 of the dark slide may be grooved at 30 for the reception of the lower end of the hooks. As mentioned the frame 25, when extracted, may serve for surveying the picture to be taken.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A back piece for film cameras comprising film supply means at one side, means for feeding a film from said supply means across the area of exposure, a dark slide inserted in said back piece below the path along which the film moves while being fed, a lid on said dark slide adapted to support the film, and cutting means at a point intermediate said film supply means and the area of exposure.

2. A back piece for film cameras comprising film supply means at one side, means for feeding a film from said supply means across the area of exposure, a bar in said back piece extending across the path along which the film moves while being fed and adapted to support the film, a dark slide inserted in said back piece with one of its ends engaging below said bar, a lid on said dark slide adapted to support the film, and cutting means adapted to move along said bar.

3. A back piece for film cameras comprising film supply means at one side, means for feeding a film from said supply means across the area of exposure, a dark slide inserted in said back piece below the path along which the film moves while being fed, cutting means at a point intermediate said film sup-
ply means and the area of exposure, and a lid on said dark slide which is kinked for said cutting means.

4. A back piece for film cameras comprising film supply means at one side, means for feeding a film from said supply means across the area of exposure, a dark slide inserted in said back piece below the path along which the film moves while being fed, a lid on said dark slide adapted to support the film, resilient means adapted to hold the film down on said lid and to be displaced by said lid, and cutting means at a point intermediate said film supply means and the area of exposure.

5. A back piece for film cameras comprising film supply means at one side, a dark slide inserted in said back piece below the path along which the film moves while being fed, a lid on said dark slide adapted to support the film, means adapted to be operated from the outside of said back piece and including hooks for engaging perforations in the film, and cutting means at a point intermediate said film supply means and the area of exposure.

6. A back piece for film cameras comprising film supply means at one side, a dark slide inserted in said back piece below the path along which the film moves while being fed, a lid on said dark slide adapted to support the film, means adapted to be operated from the outside of said back piece and including resilient hooks for engaging perforations in the film, and cutting means at a point intermediate said film supply means and the area of exposure.

In testimony whereof I affix my signature.

WILHELM WIDMANN.